(12) United States Patent
Fujita

(10) Patent No.: US 6,373,450 B1
(45) Date of Patent: *Apr. 16, 2002

(54) METHOD AND DEVICE FOR CONTROLLING SELECTION USING A SWITCH

(75) Inventor: Asako Fujita, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/526,923

(22) Filed: Sep. 12, 1995

(30) Foreign Application Priority Data

Sep. 13, 1994 (JP) .............................. 6-218482

(51) Int. Cl.$^7$ ................................. G09G 1/14
(52) U.S. Cl. ........................ 345/26; 345/56; 345/123
(58) Field of Search .................... 345/156, 145, 345/123, 26, 56, 159, 82, 169; 379/21; 340/825.01; 364/709.12, 709.16; 341/20, 21, 27

(56) References Cited

U.S. PATENT DOCUMENTS

| | | | | |
|---|---|---|---|---|
| 3,976,995 A | * | 8/1976 | Sebestyen ................ 340/365 R |
| 4,374,425 A | | 2/1983 | Fuka | |
| 4,458,238 A | * | 7/1984 | Learn ...................... 340/365 R |
| 4,675,833 A | * | 6/1987 | Cheek et al. ................ 345/144 |
| 4,908,612 A | * | 3/1990 | Bromley et al. ............. 345/159 |
| 4,922,516 A | * | 5/1990 | Butler et al. .................. 329/21 |
| 4,937,745 A | * | 6/1990 | Carmon ....................... 364/419 |
| 5,313,229 A | * | 5/1994 | Gilligan et al. ............. 345/123 |
| 5,374,942 A | * | 12/1994 | Gilligan et al. ............. 345/123 |
| 5,412,398 A | * | 5/1995 | DiSanto et al. ............. 345/107 |
| 5,432,510 A | * | 7/1995 | Matthews ..................... 341/20 |
| 5,442,378 A | * | 8/1995 | Yasuhara et al. ........... 345/123 |
| 5,530,455 A | * | 6/1996 | Gillick et al. ................ 345/123 |
| 5,633,657 A | * | 5/1997 | Falcón ......................... 345/145 |
| 5,677,949 A | * | 10/1997 | Macor ........................... 341/22 |
| 5,844,544 A | * | 12/1998 | Kahn et al. .................. 345/156 |

FOREIGN PATENT DOCUMENTS

| | | | | |
|---|---|---|---|---|
| GB | 2248955 | 4/1992 | | |
| GB | 2254462 | 10/1992 | | |
| GB | 255430 | 11/1992 | | |
| JP | 58-211261 | * 8/1983 | ............ 364/709.12 |
| JP | 1-155759 | 6/1989 | | |
| JP | 3-52338 | 3/1991 | | |
| WO | 93 14589 | 7/1993 | | |

* cited by examiner

*Primary Examiner*—Amare Mengistu
(74) *Attorney, Agent, or Firm*—Ostrolenk, Faber, Gerb & Soffen, LLP

(57) ABSTRACT

Data, including letters, numerals and marks, are sequentially scrolled on a display. When a switch is pushed, the scroll is interrupted, and then the data being displayed is fixed. An arrangement may be made such that the scroll occurs at a high speed first and then occurs at a low speec in response to the operation of the switch. Further, the data being displayed may be caused to blink for a confirmation purpose.

55 Claims, 10 Drawing Sheets

ITEM DISPLAY PORTION

| PATTERN | Q - CLOCK | S - CLOCK |
|---|---|---|
| a | ON | OFF |
| b | OFF | ON |
| c | OFF | OFF |

FIG. 8

METHOD AND DEVICE FOR CONTROLLING SELECTION USING A SWITCH

BACKGROUND OF THE INVENTION

1. Field of the Invention

The present invention relates to a method and device for controlling selection using a switch and, more particularly, to a method and device for controlling selection using a switch arranged on a miniature casing.

2. Description of the Related Art

It is a common practice with a miniature apparatus having a data display to select or fix, for example, characters on switches or push buttons. Particularly, in a telephone set with a display, the telephone numbers or names of the other parties are input on push buttons and stored. A character inputting system applicable to this type of telephone is disclosed in, for example, Japanese Patent Laid-Open Publication No. 1-155759 (JP-A-01-155759). The system disclosed in this document scrolls or fixes characters appearing on the display when the user operates a plurality of keypads.

For example, with a telephone set having many buttons, it is easy to input characters thereon. However, when it comes to a radio pager or similar miniature apparatus, the input of characters and various kinds of selection should preferably be implemented by a minimum number of buttons; many buttons would obstruct the miniaturization of a casing. Japanese Patent Laid-Open Publication No. 3-52338 (JP-A-03-052338), for example, teaches a radio pager capable of controlling stored messages with a small number of buttons. The pager taught in this document selectively displays, stores or deletes stored messages with a power switch and a message control switch. Specifically, every time the message control switch is pressed, messages are sequentially read out of a memory and displayed. Let this mode be referred to as a display mode. When the message control switch is pressed after all the messages have been displayed, the display mode is replaced with a store mode. When the message control switch is again pressed after all the messages have been displayed in the store mode, a clear mode is set up in place of the store mode. When the power switch is pressed in the store mode or the clear mode, the message appearing on the display is stored or cancelled. In this way, the message control switch is operated to replace the operation mode every time all the messages are displayed, while the power switch is operated to effect setting. Hence, the two switches suffice for both the mode change and the selection.

However, the above conventional pager needs more than two switches or buttons for the input of characters, the selection of functions, and so forth. Such switches or buttons occupy an exclusive area and increase the over-all size of the pager, thereby impairing the portability. Further, two or more switches must be operated in combination, resulting in a troublesome procedure.

SUMMARY OF THE INVENTION

It is, therefore, an object of the present invention to provide a method and a device for controlling selection using a switch and capable of eliminating the problems discussed above.

It is another object of the present invention to provide a method and a device for controlling selection using a switch and allowing data to be input or selected with a minimum number of switches.

It is a further object of the present invention to provide a method and a device for controlling selection using a switch and allowing the user to input or select data with a simple switch operation.

In accordance with the present invention, a device for controlling selection using a switch has a switch for selection, a detecting circuit for detecting the depression of the switch, a display for displaying data, and a controller. The controller scrolls, at predetermined intervals, the data to be displayed on the display, and stops, when the detecting circuit detects the depression of the switch during scrolling, the scrolling and selects the data being displayed.

Preferably, the controller has a first clock generator for generating a first clock for controlling the speed of the scrolling, and a scroll counter mans for counting the first clock. Further, the controller has a first storage for outputting, by using the counts of the scroll counter as addresses, codes for generating the data, and a data feeding circuit for generating the data in response to the codes from the first storage, and for feeding the data.

The controller may additionally have a second clock generator for generating a second clock lower in speed than the first clock, and a clock switch for selectively feeding one of the first and second clocks to the scroll counter.

The controller controls the switch such that when the switch is pushed while the scroll counter is operating with the first clock, the second clock is fed to the scroll counter, and such that when the switch is pushed while the scroll counter is operating with the second clock, the scrolling is stopped.

The controller causes the data to blink after the stop of the display. Further, the controller means selects the data being displayed when the switch is not pushed within a predetermined period of time after the execution of the blinking.

BRIEF DESCRIPTION OF THE DRAWINGS

These and other objects, features and advantages of the present invention will become more fully apparent from the following detailed description taken with the accompanying drawings in which:

FIG. 8 lists clock switching patterns particular to a switch shown in FIG. 1.

DESCRIPTION OF THE PREFERRED EMBODIMENT

Figure 1:
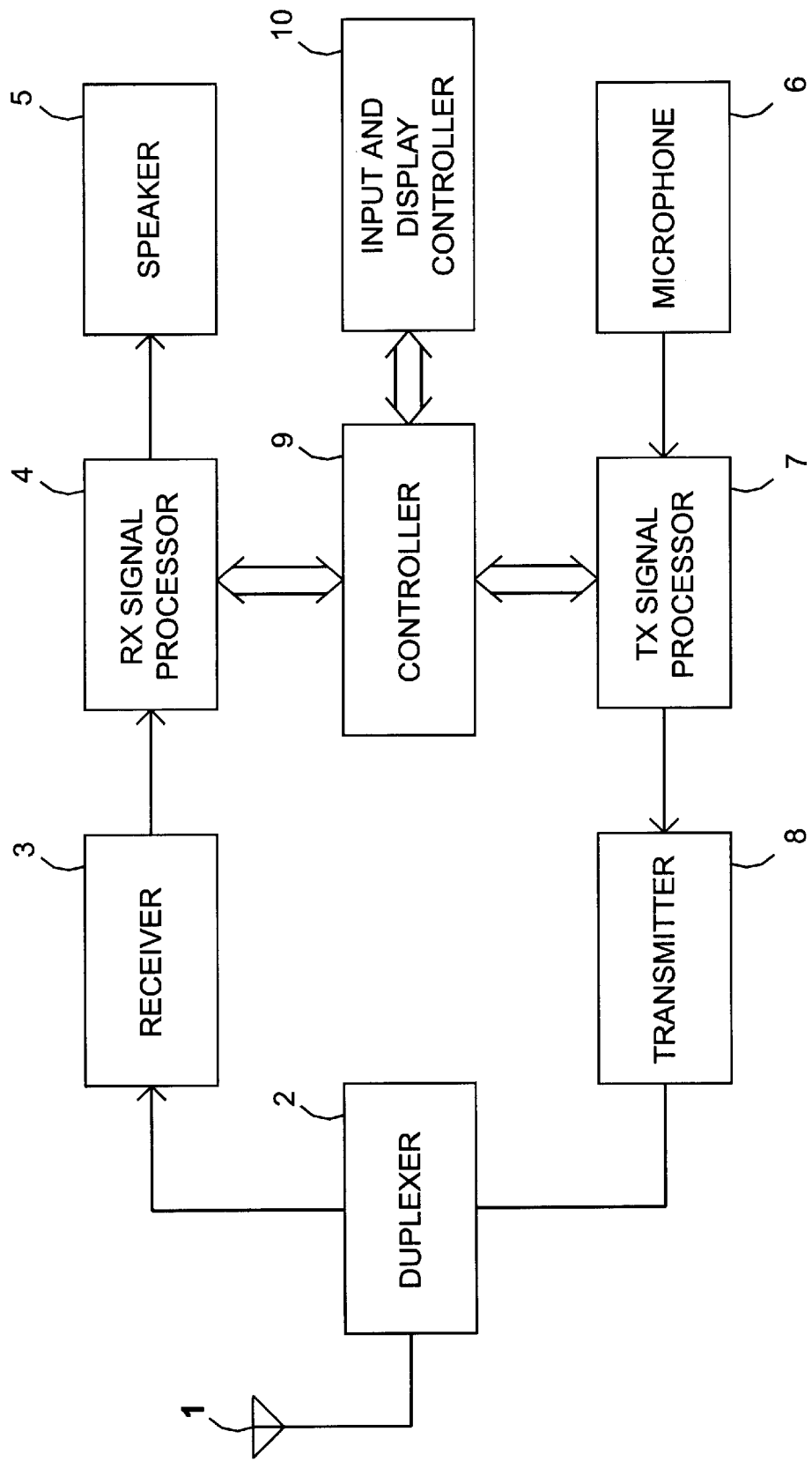
FIG. 1 is a block diagram schematically showing a portable telephone to which a preferred embodiment of the present invention is applied.

Referring to FIG. 1 of the drawings, a data display portable telephone to which a preferred embodiment of the present invention is applied is shown. As shown, the telephone has an antenna 1, a duplexer 2, a receiver 3, a processing circuit 4 for processing a received signal (referred to hereinafter as an RX signal processor) 4, a speaker 5, a microphone 6, a processing circuit 7 for processing a signal to be transmitted (referred to hereinafter as a TX signal processor 7), a transmitter 8, a controller 9, and an input and display controller 10. In the event of receipt, a signal sent from a base station, not shown, is received by the antenna 1 and applied to the receiver 3 via the duplexer 2. The receiver 3 demodulates the received signal and applies the demodulated signal to the RX signal processor 4. The RX signal processor 4 transforms the demodulated signal to a speech signal. The speech signal is outputted from the speaker 5 as speech. In the event of transmission, a speech input to the microphone 6 is fed to the TX signal processor 7. The TX signal processor 7 transforms the input speech to a speech signal to be transmitted and applies it to the transmitter 8. The transmitter 8 modulates the speech signal and sends the modulated speech signal via the duplexer 2 and antenna 1.

The controller 9 controls the RX signal processor 4, TX signal processor 7, and input and display controller 10. Preferably, on receiving a radio signal from the base station via the RX signal processor 4, the controller 9 commands the input and display controller 10 to display a received message. Also, in response to a telephone number input via the input and display controller 10, the controller 9 commands the TX signal processor 7 to send a signal.

The input and display controller 10 has a data inputting function and a setting function for allowing the user to input the other party's telephone number or the like, and to set time, volume, alarm time, etc. In addition, the controller 10 displays a telephone number, message, and other data. The controller 10 constitutes the device for controlling selection using a switch and embodying the present invention.

Figure 2:
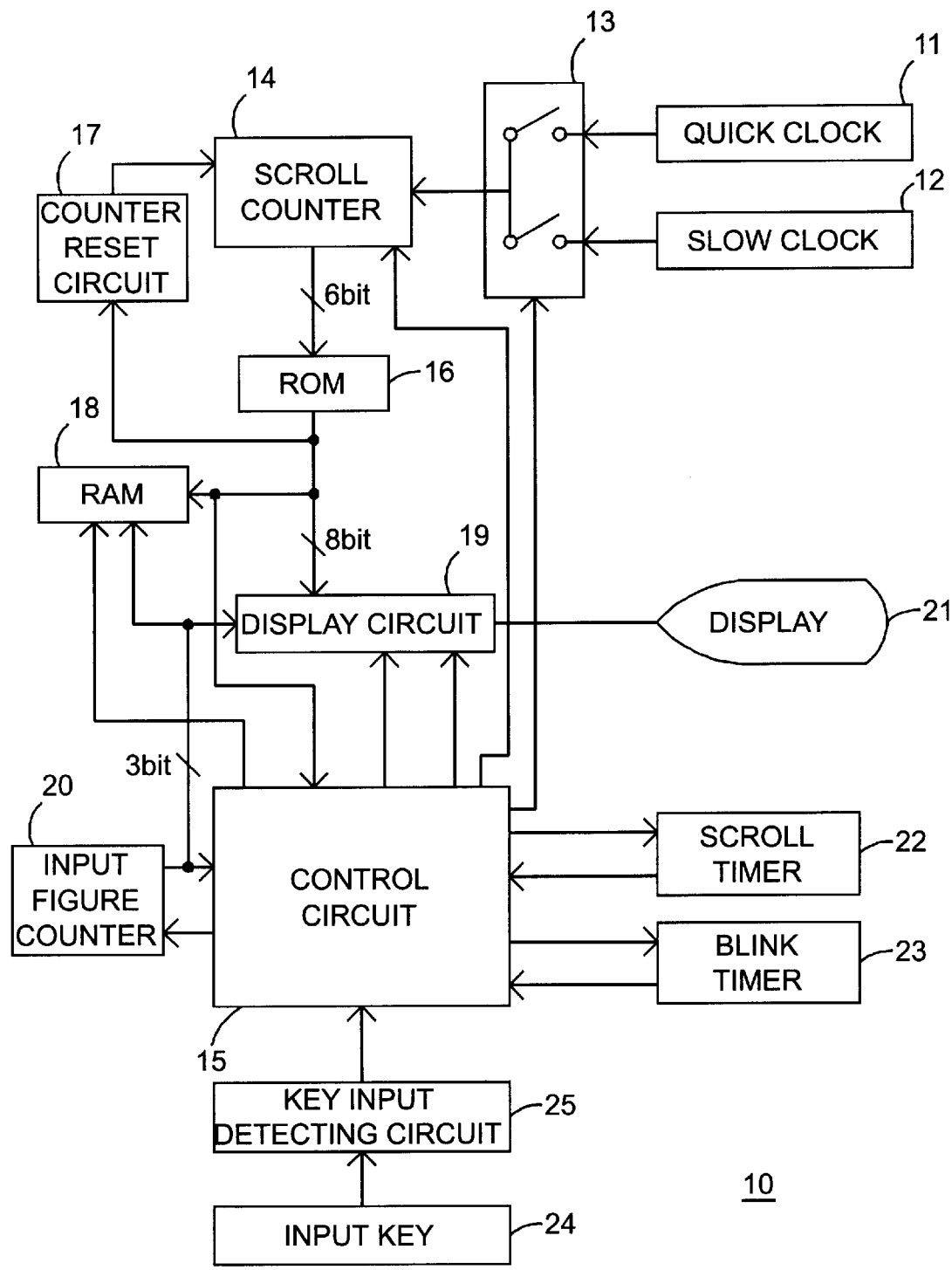
FIG. 2 is a block diagram schematically showing an input and display controller included in the embodiment.

As shown in FIG. 2, the input and display controller 10 has a switch 13 to which a quick clock 11 and a slow clock 12 are applied. The quick clock 11 outputs first square pulses whose frequency is preferably 5 Hz (period of 0.2 second). The slow clock 12 outputs second square pulses having a frequency of, preferably, 1 Hz (period of 1.0 second). For this reason, the clock 11 is referred to as a quick clock. The first and second pulses are selectively applied to a scroll counter 14 via the switch 13. Specifically, the switch 13 selectively takes one of three different positions under the control of an input control circuit 15, i.e., a position for selecting the first square pulses, a position for selecting the second square pulses, and a position for selecting neither the first square pulses nor the second square pulses. Hence, it does not occur that both of the square pulses are applied to the scroll counter 14 at the same time.

The scroll counter 14 is implemented as a binary six-step counter and counts up the clock pulses from the switch 13. A six-bit count output from the counter 14 is used as the address of a ROM (Read Only Memory) 16. The counter 14 is reset by a reset signal fed from a counter reset circuit 17 or the input control circuit 15.

When count or address information is fed from the scroll counter 14 to the ROM 16, eight-bit data is read out of the address of the ROM 16 designated by the count and delivered to the input control circuit 15 and counter reset circuit 17 as well as to a RAM (Random Access Memory) 18 and a display circuit 19. Preferably, the eight-bit data is implemented as a character code. When the counter reset circuit 17 detects data representative of the end of the data sequence fed from the ROM 16, it delivers a reset signal to the scroll counter 14. For the data representative of the end of the data sequence, use may be made of a null code "00" Hex.

An input figure counter 20 is a binary three-step up-down counter. The counter 20 counts up the current count in response to an upcount command from the input control circuit 15, or counts it down in response to a downcount command from the same. The three-bit count output from the counter 20 is fed to the RAM 18, display circuit 19, and input control circuit 15.

The display circuit 19 receives the count from the input figure counter 20 as information representative of an input figure position. In response, the display circuit 19 outputs the eight-bit character code data received from the ROM 16 on a display 21 as pattern data for display. When the display circuit 19 receives a blink command signal from the input control circuit 15, it causes the figure designated by the counter 20 to blink. Likewise, on receiving a display clear command signal from the input control circuit 15, the display circuit 19 initializes the display 21 to make all the figures blank.

The RAM 18 receives the character code from the ROM 16 as data and receives the input figure position from the input figure counter 20 as an address. When the RAM 18 receives a data store command signal from the input control circuit 15, it writes the character code data in the above address. That is, the RAM 18 stores the result of the input to the input and display controller 10, FIG. 1. The display 21, for example an LCD (Liquid Crystal Display), receives the pattern data for display from the display circuit 19 and displays it. The number of figures of the display 21 may be, but not limited to, eight.

A scroll timer 22 starts counting time in response to a count start signal from the input control circuit 15. In response to a count stop signal from the circuit 15, the timer 22 stops counting time and resets its value to zero. Preferably, the maximum time which the timer 22 counts is 4 seconds. When the time set by the count start time from the circuit 15, e.g., 4 seconds elapse, the timer 22 informs the circuit 15 of the overflow and resets its value to zero.

An input key 24 is a non-lock type push switch which turns on when pushed and turns off when released. A key input detecting circuit 25 is responsive to the state of the input key 24 and reports it to the input control circuit 15.

Figure 3:
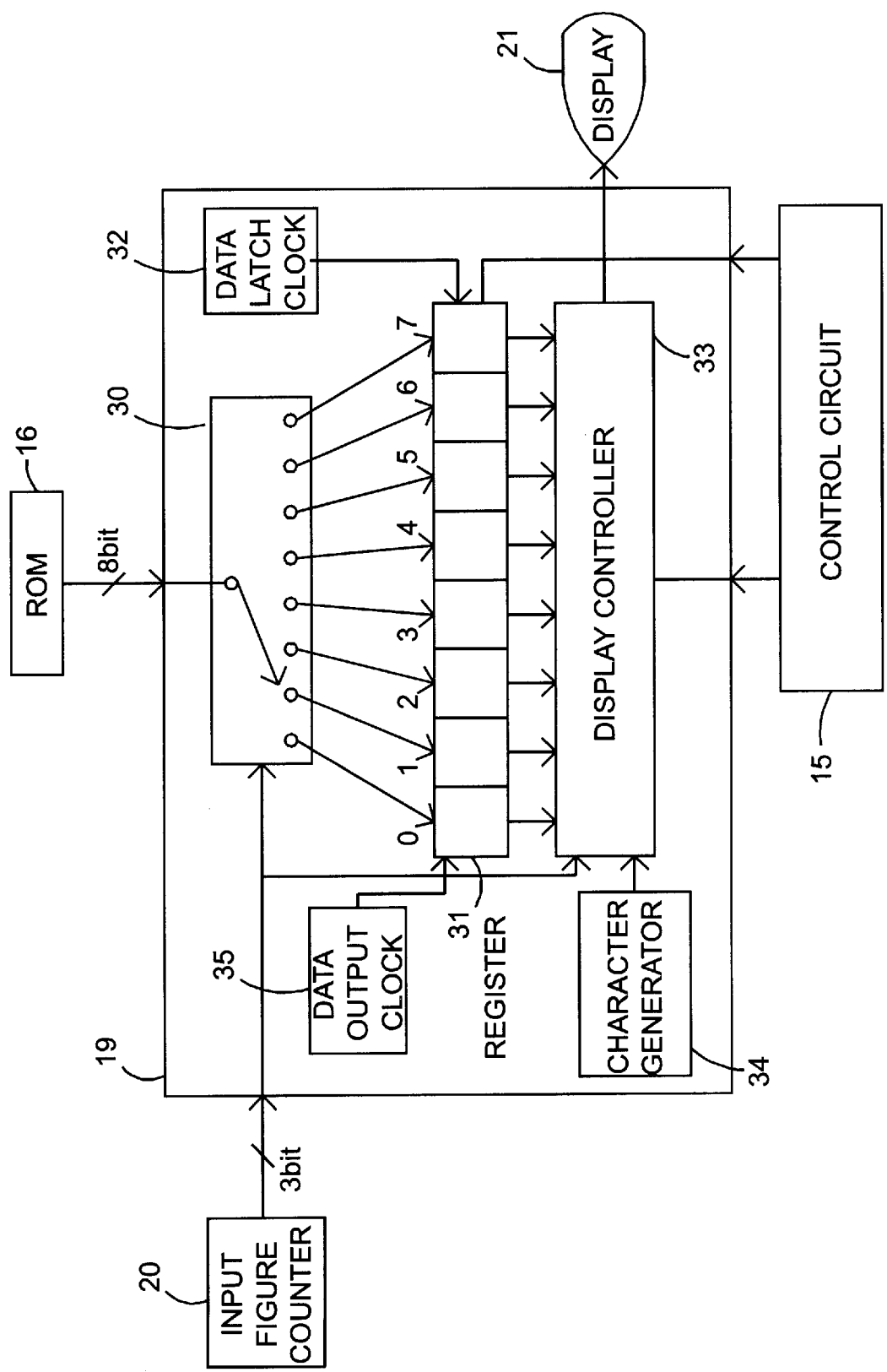
FIG. 3 is a block diagram schematically showing a display circuit included in the input and display controller.

The display circuit 19 is shown in FIG. 3 specifically. As shown, the display circuit 19 has a selector 30 which receives from the input figure counter 20 the information representative of a three-bit (0–7) input figure position. In response, the selector 30 selects a particular figure of a character code register 31 for storing the character code from the ROM 16. Specifically, the character code register 31 latches the character code via the selector 30 at the positive going edge of a data latch clock 32. Initially, registers constituting the character code register 31 each stores a character code corresponding to a blank. Preferably, the data latch clock 32 outputs square pulses having a frequency of 10 Hz which is double the frequency of the quick clock 11.

A display controller 33 receives character codes from the registers of the character code register 31 at the period of a data output clock 35. At the same time, the display controller 33 delivers to the display 21 pattern data for displaying characters corresponding to the character codes and generated by a character generator 34. When the blink control signal from the input control circuit 15 is electrically in a high level, the controller 33 causes the figure designated by the input figure information to blink. When the signal is electrically in a low level, the controller 33 does not cause the figure to blink.

Figure 4A:
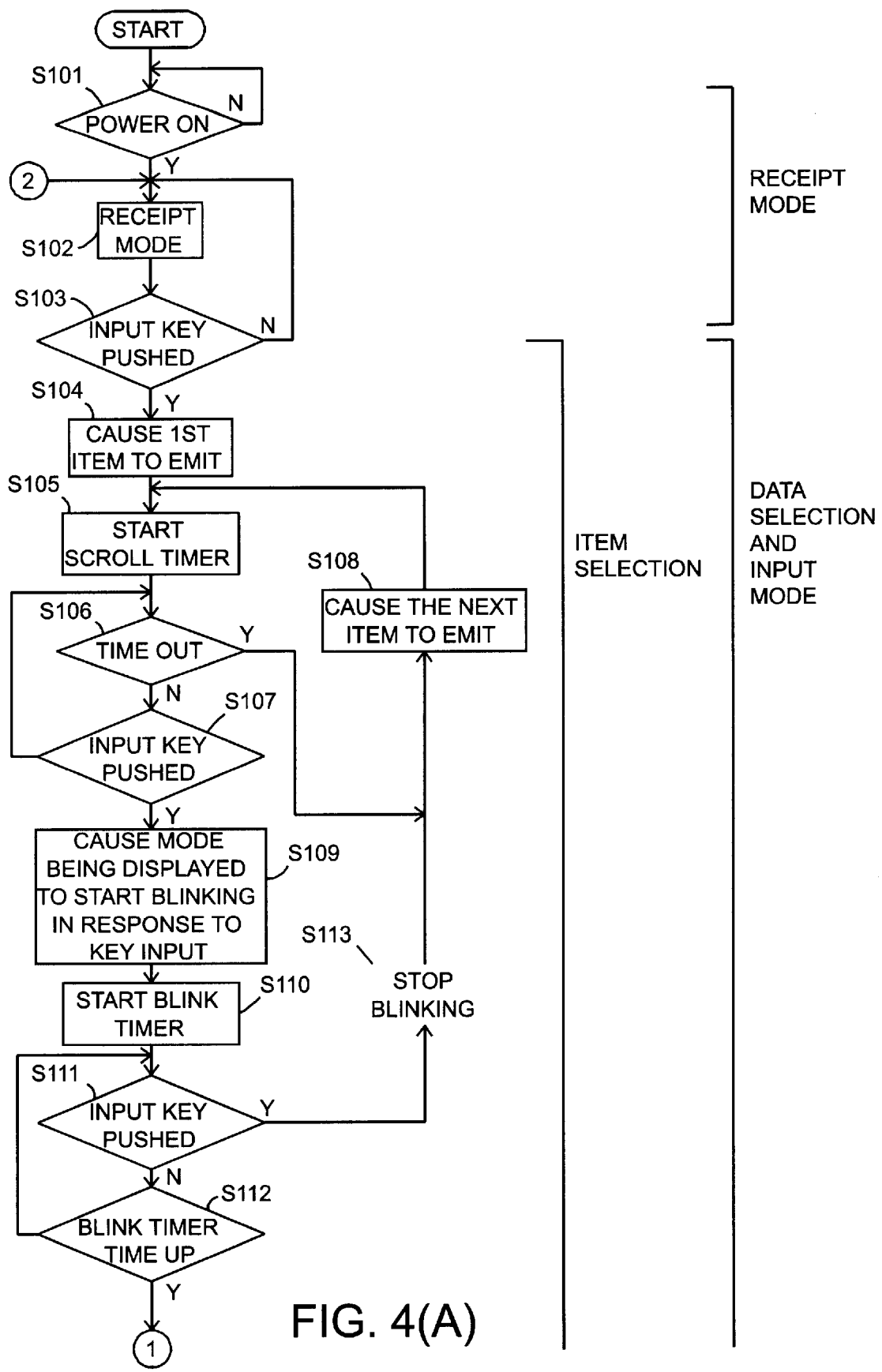
FIGS. 4(A) and 4(B) are flowcharts demonstrating a specific operation of the embodiment.

The operation of the illustrative embodiment will be described with reference to FIGS. 4(A) and 4(B). As shown, the operation is generally made up of three different modes, i.e., a receipt mode, a data selection and input mode, and a selected item processing mode. Further, the data selection and input mode is subdivided into a step of selecting an item to be processed, and a step of inputting data. FIGS. 5(A)–5(D) each shows the display 21 in a particular condition to occur in the above item selecting step.

On the power up of the telephone (step S101), the telephone enters into the receipt mode and waits for a radio signal from a base station (step S102). When the input key or switch 24 is pushed in the receipt mode (Y, step S103), the receipt mode is replaced with the data selection and input mode.

Figure 5A:
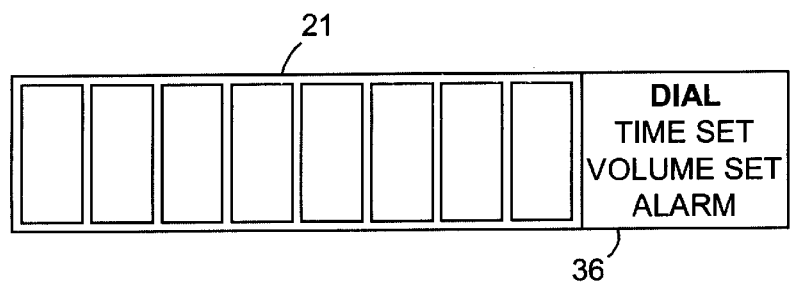
FIGS. 5(A)–5(D) each shows a display included in the input and display controller in a particular condition to occur in an item selecting step.
Figure 5B:
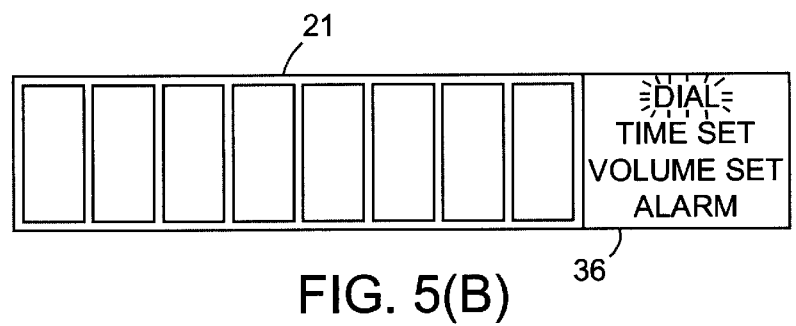
Figure 5C:
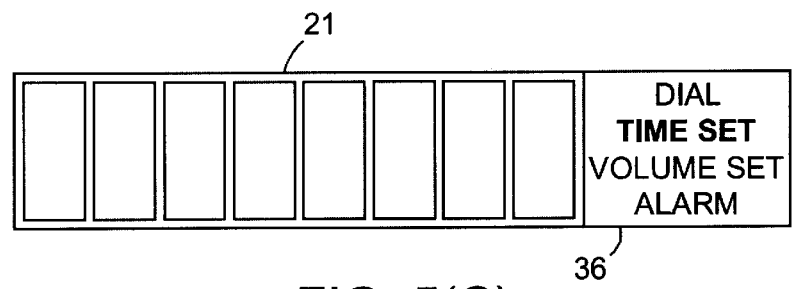

In the data selection and input mode, one of a plurality of items to be selected emits in an item display portion 36 next to the display 21 (step S104). In the illustrative embodiment, there can be selected four different items, i.e., dialing, time setting, volume setting, and alarm time setting. As shown in FIG. 5(A), characters indicating each item, "DIAL", "TIME SET", "VOLUME SET" and "ALARM" are pict-displayed in the item display portion 36 next to the display 21 beforehand and one item is emitted. When the input key 24 is pushed in the receipt mode (Y, step S103), the input control circuit 15 delivers a count start signal to the scroll timer 22 and thereby causes it to start counting time (step S105). When the input key 24 is pushed before the time of the scroll timer 22 counts is up (N, step S106 and Y, step S107), the item glowing in the portion 36 is caused to blink by the input control circuit 15 (step S109; FIG. 5(B)). When the input key 24 is not pushed during the above period of time (Y, step S106), the next item glows (step S108; FIG. 5(C)). In this way, the four different items are sequentially caused to emit. While the scroll timer 22 is assumed to count four (4) seconds, it may count, for example, 1 second for a time reduction purpose.

Figure 5D:
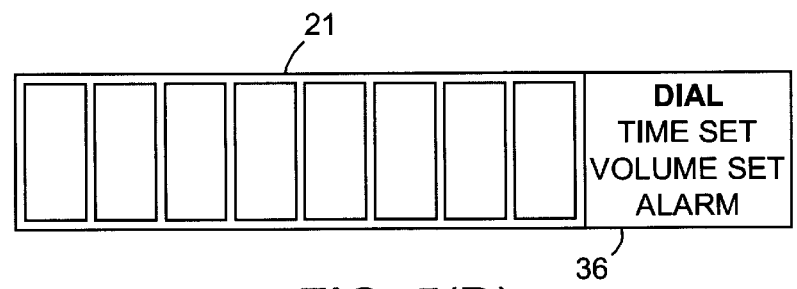

When the time is caused to blink in the step S109, the blink timer 23 starts (step S110). Specifically, the blink timer 23 starts counting a predetermined period of time in response to a start signal fed from the input control circuit 15. When the input key 24 is pushed before the time of the blink timer 23 is up (Y, step S111 and N, step S112), the item in the display portion 36 stops blinking (step S113). This is followed by the previously mentioned step S108. On the other hand, if the input key 24 is not pushed (Y, step S112), the item in the display portion 36 stops blinking (step S114; FIG. 5(D)) and is fixed (step S115). The blinking is used for the user's confirmation.

When the item is fixed in the step S115, data matching the item is input (step S116; data inputting step). Then, particular processing is executed (step S117; selected item processing mode). For example, when the item "DIAL" is selected, a telephone number is input in the data inputting step, and then call origination and conversation are effected in the selected item processing mode.

A reference will be made to FIGS. 6–8 for describing the data inputting step in detail. The selected item processing mode following the data inputting step is conventional and will not be described in order to avoid redundancy. FIG. 6 is a flowchart representative of the data inputting step. FIGS. 7(A)–7(D) each shows the display 21 in a particular condition. FIG. 8 lists switching patterns available with the switch 13.

Figure 4B:
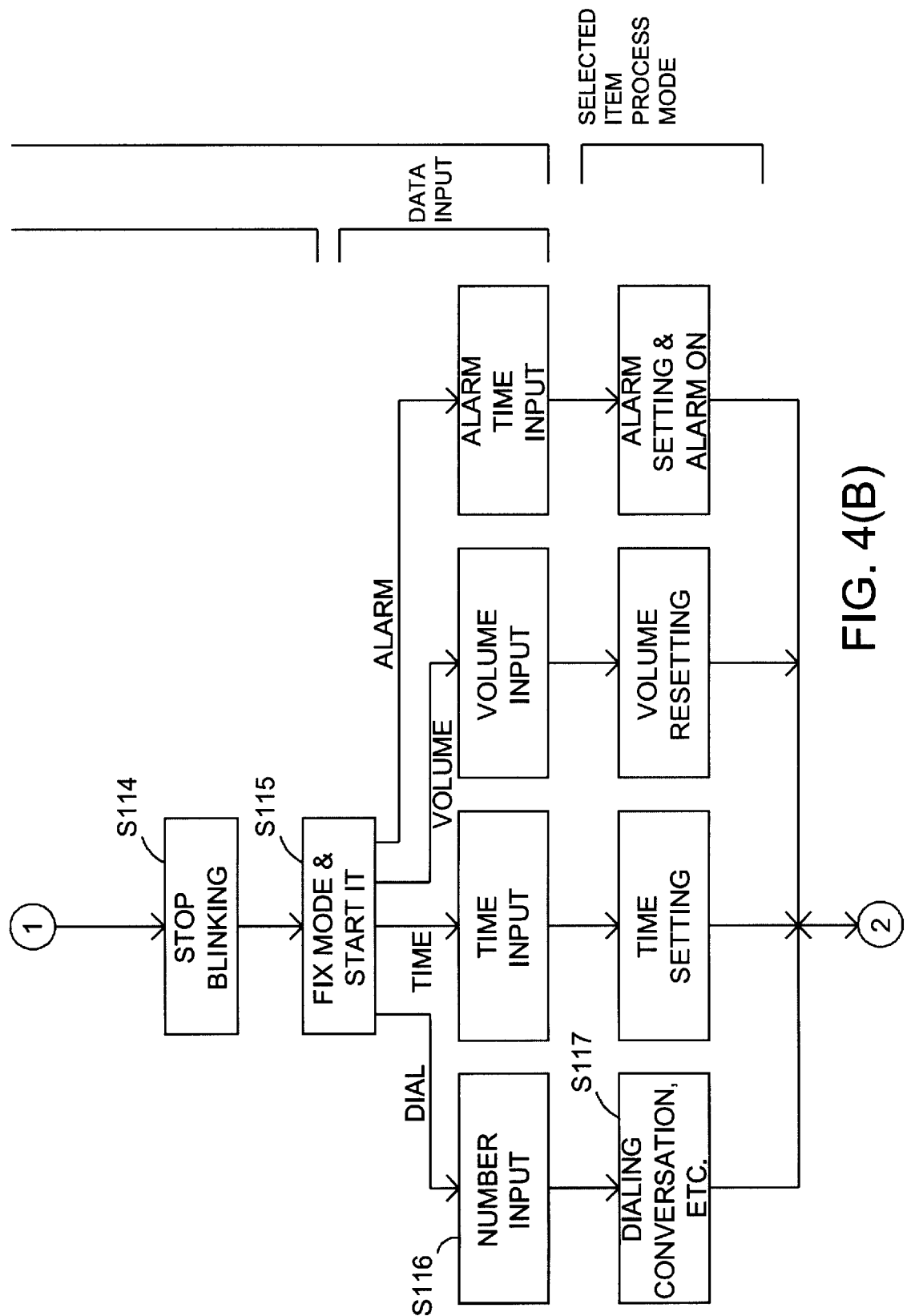
Figure 7A:
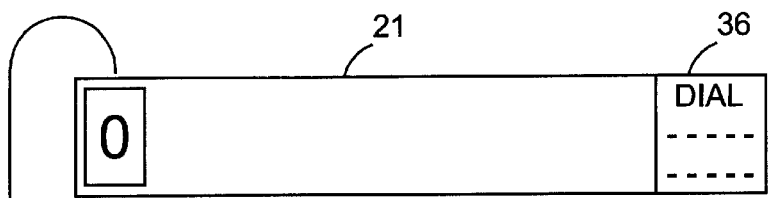
FIGS. 7(A)–7(D) each shows the display in a particular condition to occur in the data inputting step.
Figure 7B:
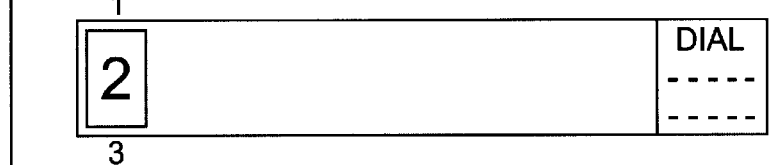

In the data inputting step following the selection of the desired item, as shown in FIGS. 4(B), the item selected glows in the item display portion 36, FIG. 5A. Assume that the dialing function is selected by way of example, as shown in FIG. 7(A).

Figure 6A:
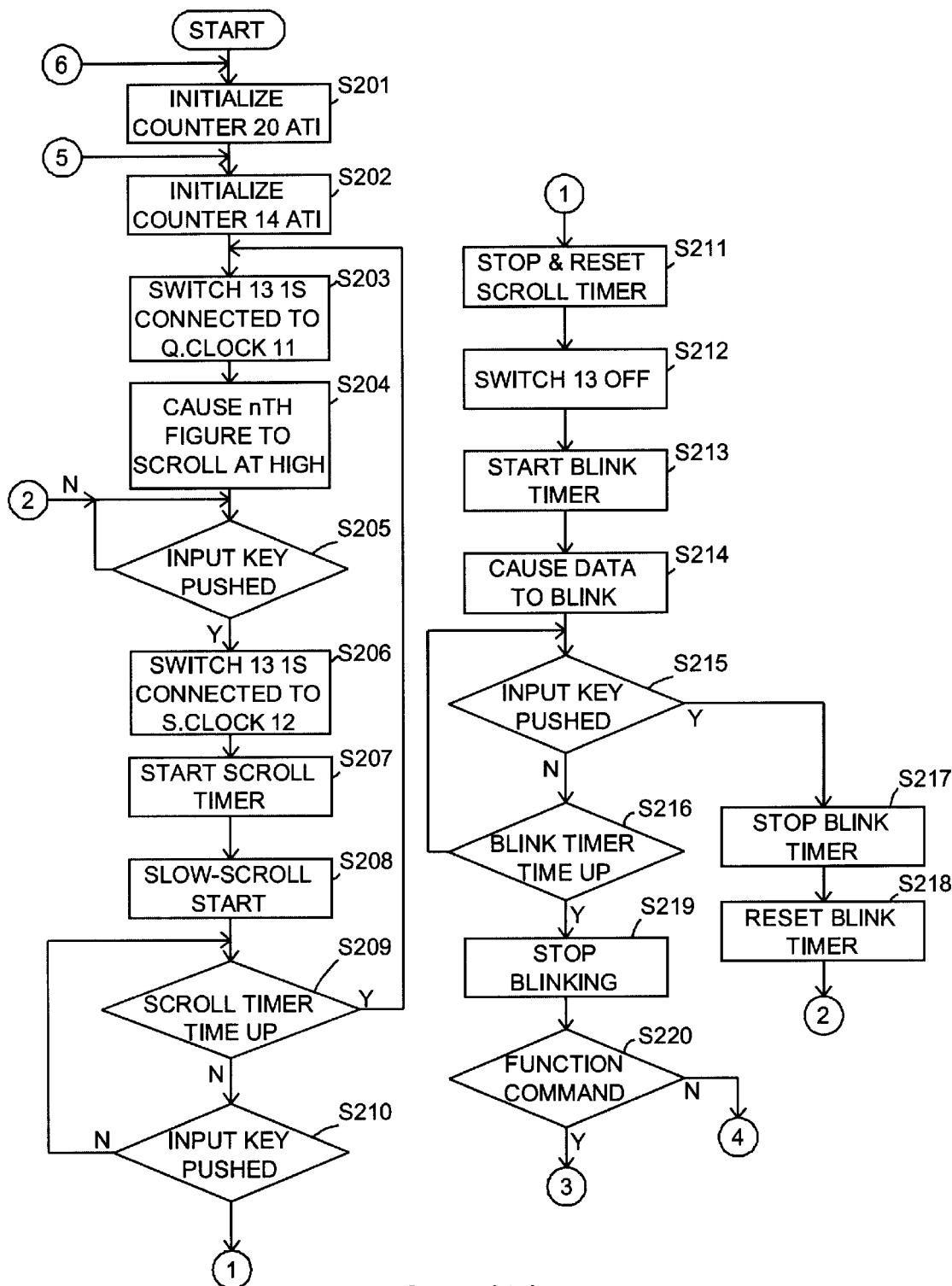
FIGS. 6(A) and 6(B) are flowcharts representative of a data inputting step included in the procedure of FIGS. 4(A) and 4(B)

In the dialing function, a telephone number is input as data first. As shown in FIG. 6(A), when the desired item is fixed in step S115, FIG. 4(B), the input control circuit 15 initializes the input figure counter 20 to one (1) (step S201) and the scroll counter 14 to zero (0) (step S202). Then, the input control circuit 15 so controls the switch 13 as to feed the quick clock 11 to the scroll counter 14 (step S203); a switching pattern a shown in FIG. 8 is set up. Because the input figure counter 20 outputs "1" first, one of characters or the like read out of the ROM 16 in response to the output of the counter 14 appears on the display on the first figure of the display 21. The counter 14, operating in synchronism with the quick clock 11, causes the characters on the nth ($8 \geq n \geq 1$) figure to be sequentially scrolled at a high speed, e.g., every 0.2 second (step S204). Preferrably, first figure is scrolled at first. The data to appear on the display 21 are numerals representative of a telephone number or letters representative of a function command. When the input key 24 is pushed while the characters on the first figure are sequentially scrolled (Yes, step S205), the key input detecting circuit 25 detects the depression of the input key 24. Then, the circuit 25 informs the input control circuit 15 of the depression. In response, the input control circuit 15 replaces the pattern a of the switch 13 with a pattern b (step S206) and causes the scroll timer 22 to start counting time (step S207). As a result, the slow clock 12 is applied to the counter 14 in place of the quick clock 11, thereby the characters are scrolled at a low speed (step S208), e.g., every 1 second. The low-speed scroll allows the user to select desired one of the characters when it approaches the display 21. The high-speed scroll continues so long as the input key 24 is not pushed in the step S205. While the high-speed scroll allows the desired character to appear on the display 21 rapidly when the number of characters is great, only the low-speed scroll may be used when the number of characters is small or in order to simplify the control.

Figure 7C:
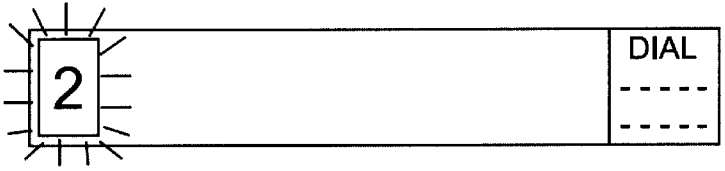
Figure 7D:
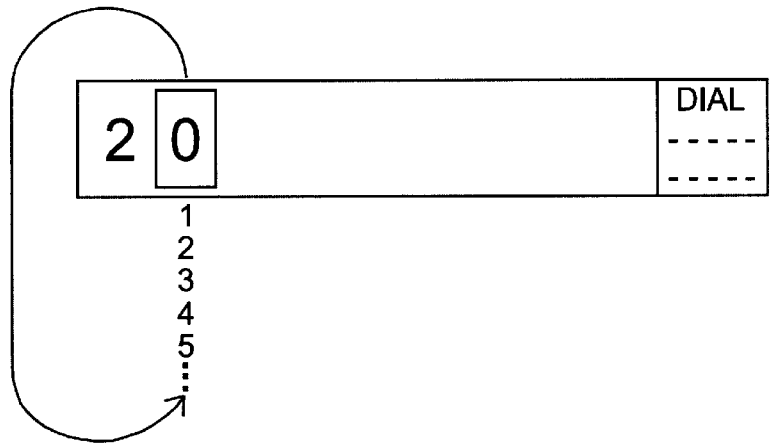

The low-speed scroll continues until the input key 24 has been pushed. However, when the time of the scroll timer 22 is up, the low-speed scroll is again replaced with the high-speed scroll (step S209). When the input key 24 is pushed (Yes, step S210) before the time of the scroll timer 22 is up (No, step S209), the input control circuit 15 stops and resets the scroll timer 22 (step S211), and interrupts the delivery of the clocks via the switch 13 (step S212), as represented by a pattern c in FIG. 8. Consequently, the scroll of the first figure is interrupted. Subsequently, the input control circuit 15 causes a blink timer 23 to start counting time (step S213) and causes the character selected on the first figure to blink (step S214). The character on the first figure continuously blinks until the time of the blink timer 23 is up (Yes, step S215; FIG. 7(C)). However, when the input key 24 is pressed (Yes, step S214), the blinking character is cancelled, the blink timer 23 is stopped and reset (steps S217 and S218). Then the display 21 is again scroll at the high speed.

When the time of the blink timer 23 is up before the input key 24 is pushed (No, step S215 and Yes, step S216), the blinking is stopped (step S219) and the input control circuit 15 determines whether or not the character appearing on the display 21 is a character representative of a function command (step S219). If the answer of the step S220 is negative (No), the circuit 15 determines that the character is fixed, stops the blinking, and writes the character in the RAM 18 (step S221 in FIG. 6(B)). If he inputting operation has not proceeded up to the last figure (No, step S222), the circuit 15 feeds a count up signal to the input figure counter 20 and thereby increments the counter 20 by one (step S223). As a result, the display position on the display 21 is shifted to the second figure and the characters are scrolled on the second figure (FIG. 7(D)). The inputting operation ends when data are entered on all the input digits. (Yes, step S222).

If the character is representative of a function command, as determined in the step S220, the following steps are executed. Preferably, the function command is used to cancel a character inadvertently fixed, or to cancel all the characters input. In addition, the function command is used to change the item selected. In the illustrative embodiment, function commands represented by letters "Del", "Clr" and "Stop" are available. "Del" is used to cancel a single character while "Clr" is used to cancel all the characters input. "Stop" is used to stop the data inputting mode.

Figure 6B:
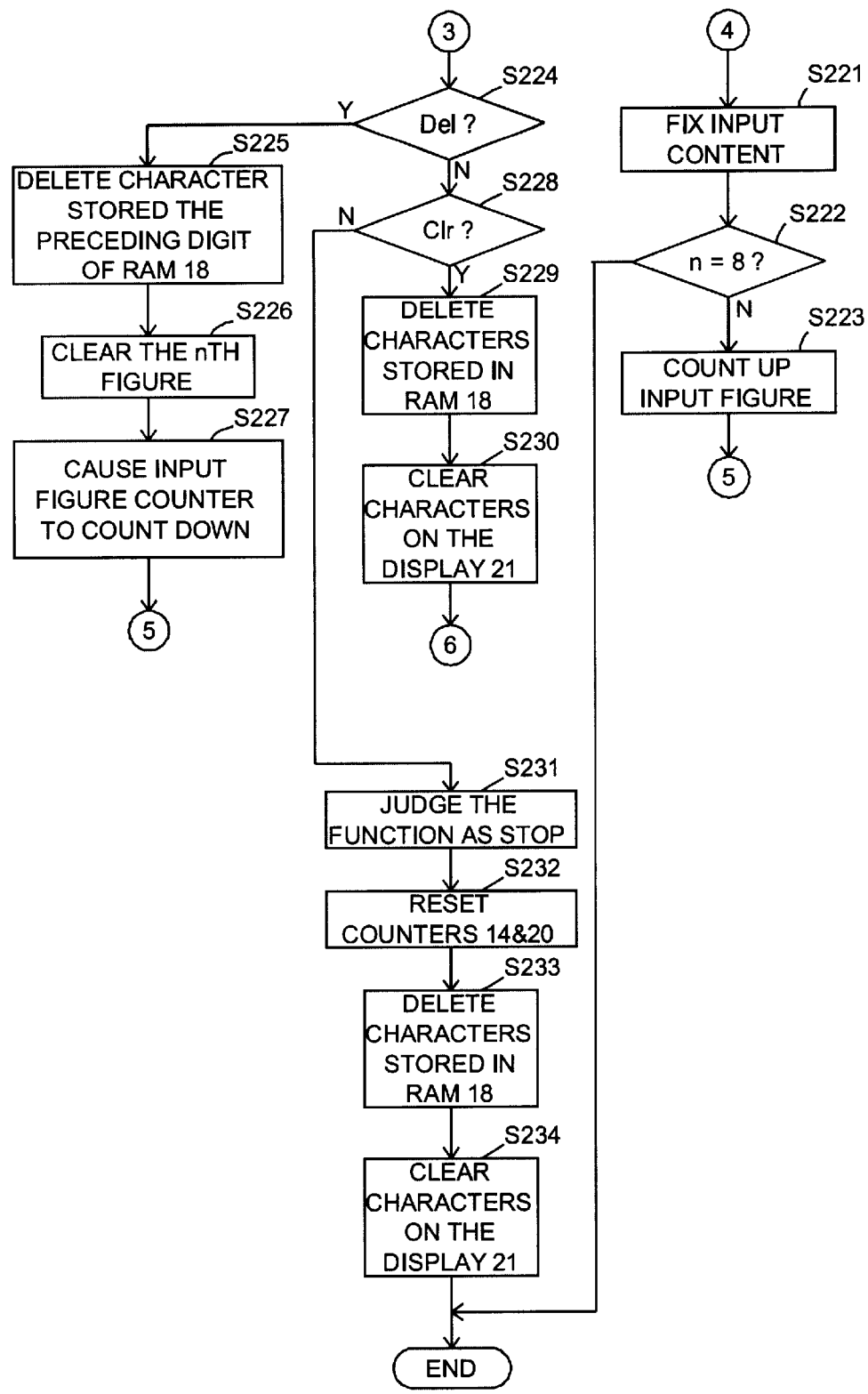

When "Del" is selected on the display 21 (Yes, step S224 in FIG. 6(B)),the input control circuit 15 deletes the character stored in the address of the RAM 18 corresponding to the preceding digit (step S225), and clears the nth figure of the display 21 (step S226). This allows the user to again input data on the immediately preceding digit. Then, the input control circuit 15 delivers a command signal to the input figure counter 20 for causing it to count down (step S227). As a result, the program returns to the input of data on the immediately preceding figure. When "Clr" is selected on the display 21 (No, step S224 and Yes, step S228), the input control circuit 15 deletes all the character codes written to the RAM 18 (step S229), clears all the characters appearing on the display 21 (step S230), and then resets the input figure counter 20 and scroll counter 14 (steps S201 and S202).

If "Clr" is not selected on the display (No, step S228), the input control circuit 15 judges that "stop" is selected (step S231). Then, the input control circuit 15 resets the input figure counter 20 and scroll counter 14 (step S232), deletes all the character codes written to the RAM 18 (step S233), and then clears all the characters appearing on the display 21 (step S234).

In summary, in accordance with the present invention, a single key allows the user to input or select letters, numerals, marks or functions, as desired. The present invention, therefore, successfully reduces the number of keys and thereby implements a miniature apparatus with a minimum of area allocated to keys. This is particularly prominent when it comes to a portable apparatus.

Further, high-speed scroll and low-speed scroll available with the present invention allows data to be input and selected efficiently in a short period of time. In addition, while the key is pushed to fix desired one of characters and function commands sequentially appearing on a display, the character once fixed is caused to blink for a predetermined period of time. Hence, the user can confirm the character and cancel it, if necessary.

While the invention has been described with reference to a specific embodiment thereof, it will be appreciated by those skilled in the art that numerous variations, modifications, and embodiments are possible, and accordingly, all such variations, modifications, and embodiments are to be regarded as being within the spirit and scope of the invention. For example, a single key for data input and selection may be replaced with a plurality of keys which can be efficiently operated. The cruz of the present invention is that letters, numerals, marks and other data, as well as items to emit, are sequentially scrolled at predetermined intervals, and one of them is fixed by the key or keys. Of course, "DIAL" "TIME SET", "VOLUME SET" and "ALARM SET" shown and described are merely specific items to be selected and may be replaced with any other desired items.

What is claimed is:

1. A device for selecting characters comprising:

a display having a plurality of character positions;

a manually operable switch having a first rest position and a second activated position;

a timer for defining a succession of first time periods; and a control circuit for enabling an operator of the device to select specific characters to be displayed at each of the character positions solely by operating the switch from the rest position to the activated position;

the control circuit being operative in response to a start command to activate a first one of the character positions, and to operate the activated character position to display the characters from which the selection may be made at the activated character position, one character being displayed during each of the defined time periods;

the control circuit being responsive to operation of the switch to the activated position to retain a display in the activated character position of the character displayed there at the time the switch was operated, and to activate a second one of the character positions.

2. A device according to claim 1, in which the control circuit is further responsive to selection of the character by operation of the switch to the activated position to initiate a predetermined selection interval, and responsive to the position of the switch during the selection interval to confirm the character selection by activating the second character position.

3. A device according to claim 2, wherein the control circuit activates each of the character positions in turn until characters have been selected for all of the character positions.

4. A device according to claim 2, in which the control circuit is responsive to the absence of a second operation of the switch to the activated position during the selection interval to confirm the character selection.

5. A device according to claim 2, in which the control circuit is responsive to operation of the switch to the activated position during the selection interval to resume the display of the succession of characters at the first character position.

6. A device according to claim 2, in which the control circuit is operative to intermittently display the selected character at the first character position during the selection interval and to continuously display the selected character at the first character position after the second character position has been activated.

7. A device according to claim 1, wherein, to select a specific character for the activated character position, the switch must be operated at twice from the rest position to the activated position.

8. A device according to claim 1, in which the control circuit activates each of the character positions in turn until characters have been selected for all of the character positions.

9. A device according to claim 1, in which the timer is operative to define a succession of second time periods, the second time periods being shorter than the first time periods, and in which, upon activation of a character position, the control circuit is operative to display the succession of characters which may be selected at a rate corresponding to the second time period; in which the control circuit further includes a scroll timer operative to define a predetermined scrolling interval, and in which the control circuit is further responsive to a first operation of the single manual switch, to start the scroll timer, to suspend display of the succession of characters at the rate corresponding to the second time period, and to display the succession of characters at a rate corresponding to the first time period, and responsive to operation of the switch during the scrolling interval, to select a character for the activated character position.

10. A device according to claim 9, in which the control circuit is operative to resume display of the succession of characters at the rate corresponding to the second time period if the single manual switch is not operated during the scrolling interval.

11. A device according to claim 9, in which the control circuit is further responsive to selection of the character by operation of the single manual switch to define a predetermined selection interval, and responsive to the position of the switch during the selection interval to confirm the character selection by activating the second character position.

12. A device according to claim 11, which the control circuit is responsive to operation of the switch during the selection interval to reset the scroll timer and to resume display of the succession of characters at the rate corresponding to the first time period.

13. A device according to claim 12, in which the control circuit is responsive to the absence of a second operation of the single manual switch during the selection interval to confirm the character selection.

14. A device according to claim 1, in which the control circuit is operative to respond to a predetermined set of function command characters, each having a specific action for the control system associated therewith, and in which the control system is further operative to identify a selected character, and prior to activating a second character position, if the selected character is identified as one of the function command characters, to initiate the specific action associated with the identified function character.

15. A device according to claim 14, in which the control system is operative to clear the character displayed at the activated character position, and to reactivate the immediately previous character position to permit selection of a new character for that immediately previous character position if the selected character is identified as a first specific function command character.

16. A device according to claim 14, in which the control circuit is operative to clear the characters displayed in the activated character position and in all previously activated character positions, and to reactivate the first character position of the plurality of character positions to permit selection of new characters for all character positions if the selected character is identified as a second specific function command character.

17. A device according to claim 14, in which the control circuit is operative to clear the characters displayed in the activated character position and in all previously activated character positions, and to terminate operation of the device if the selected character is identified as a third specific function command character.

18. A device according to claim 14, in which, if the selected character is not identified as a function character, the control circuit is operative to activate the second character position.

19. A character selection and display controller for a display device having a plurality of display elements, the controller comprising:
a character generating circuit connected to the display device for generating a sequence of character display signals, each signal representing one character available for display;
a display element controller operable to activate one of the display elements to receive the character display signals;
a clock circuit for generating a succession of scrolling control signals at a predetermined frequency;
a switch manually operable between a first rest position and a second activated position;
a scroll controller responsive to the succession of scrolling control signals to scroll the output of the character generating circuit through the sequence of character display signals at the first frequency; and
a control circuit responsive to operation of the switch to the activated position to maintain a display by the activated display element of the character being displayed at the time the switch was operated to the activated position.

20. A device according to claim 19, further including:
a selection timer connected to the control circuit for generating a signal defining a predetermined selection interval, and in which the control circuit is responsive to operation of the switch while the character generating circuit output is being scrolled at the first frequency to suspend the operation of the scroll controller and to start the selection timer, and responsive to a predetermined position of the switch while the selection interval signal is being generated to activate the next display element in the sequence of display elements by operating the display element controller.

21. A device according to claim 20, in which the display element controller includes a position counter,
the control circuit being operable in response to a start command to initialize the position counter and to activate the first display element, and further operable to increase the count of the position counter during each successive selection interval if the switch is not operated to the activated position during that selection interval, thereby to activate each of the display elements in turn so that characters may be selected for all of the display elements.

22. A device according to claim 20, in which the control circuit is responsive to operation of the switch while the selection interval signal is being generated to restart the scroll controller.

23. A device according to claim 20, in which the display clement controller is operative to intermittently display the character being maintained on the first display clement while the selection interval signal is being generated, and to continuously display the selected character on the first display element after the second display element has been activated.

24. A device according to claim 19 further including:
a scroll timer connected to the control circuit for generating a signal defining a predetermined scrolling interval; in which the clock circuit is further operative to generate a succession of fast clock signals at a second frequency greater than the first frequency, in which the control circuit is responsive to activation of a character position to operate the scroll controller in response to the second frequency, responsive to a first operation of the switch while the scroll controller is being operated at the second frequency to start the scroll timer, to suspend operation of the scroll controller at the second frequency, and to operate the scroll controller at the first frequency, and responsive to operation of the switch while the scrolling interval signal is being generated to suspend operation of the scroll controller, and to maintain a display of the character being displayed on the activated display element when the switch was operated.

25. A device according to claim 24 in which the control circuit is operative to operate the scroll controller to resume display of the succession of characters at the second frequency if the switch is not operated while the scrolling interval signal is being generated.

26. A device according to claim 24 further including a selection interval timer, and in which the control circuit is responsive to operation of the single manual switch while the scrolling interval signal is being generated to start the selection interval timer, and responsive to a predetermined position of the switch during the selection interval to confirm the character selection by activating the second character position.

27. A device according to claim 26, in which the control circuit is responsive to absence of an operation of the switch while the selection interval signal is being generated to confirm the character selection.

28. A device according to claim 24, in which the control circuit is responsive to operation of the switch while the selection interval signal is being generated to reset the scroll timer and to resume display of the succession of characters at the first frequency.

29. A device according to claim 28, in which the control circuit is responsive to the absence of an operation of the switch while the selection interval signal is being generated to confirm the character selection.

30. A device according to claim 19, in which the control circuit is operative to respond to a predetermined set of function command characters, each having a specific action for the control circuit associated therewith, and in which the control circuit is further operative to identify a selected character prior to activating another display element, and to initiate the specific action associated with the identified function character if the selected character is identified as one of the function command characters.

31. A device according to claim 30, in which the control system is operative to clear the character displayed at the activated character position, and to reactivate the immediately previous character position to permit selection of a new character for that immediately previous character position if the selected character is identified as a first specific function command character.

32. A device according to claim 30, in which the control circuit is operative to clear the characters displayed in the activated character position and in all previously activated character positions, and to reactivate the first character position of the plurality of character positions to permit selection of new characters for all character positions if the selected character is identified as a second specific function command character.

33. A device according to claim 30, in which the control circuit is operative to clear the characters displayed in the activated character position and in all previously activated character positions, and to terminate operation of the device if the selected character is identified as a third specific function command character.

34. A device according to claim 30, in which the control circuit is operative to activate the second display element if the selected character is not identified as a function command character.

35. A device according to claim 30, in which: the display element control circuit includes an up-down counter, the outputs of which, as the count is incremented, represent the sequence of display elements in the display device, and, as the count is decremented, represent the reverse of the sequence of display elements in the display device, and in which the control circuit is responsive to the selected character being identified as a first specific character to decrement the count of the up-down counter, is responsive to the selected character being identified as a second or a third specific character to reset the count of the up-down counter to an initial value and is responsive to the selected character being identified as a character other than one of the first, second, or third specific characters to increment the count of the up-down counter.

36. A device according to claim 19, in combination with a miniaturized communication apparatus, the communication apparatus including a receiver for receiving radio signals.

37. A device according to claim 36, further including a transmitter for transmitting radio signals.

38. A device according to claim 37, in which the communication apparatus is a telephone, and in which the specific characters to be selected and displayed comprise telephone numbers.

39. A device according to claim 19, further including:
a selection timer connected to the control circuit for generating a signal defining a predetermined selection interval, and in which the control circuit is responsive to operation of the switch to the activated position while the character generating circuit Output is being scrolled at the first frequency to suspend scrolling the output of the character generating circuit and to start the selection timer, and is further responsive to the position of the switch during the selection interval to operate the display element controller to activate the next display element in the sequence of display elements.

40. A method for selecting and storing characters using a display device having a plurality of character positions and a single switch manually operable between a first and a second position, the method comprising the steps of:
activating a first one of the character positions to display the characters which may be selected;
establishing a succession of character display periods;
sequentially displaying in succession in the activated character position, each of the available characters, with one character being displayed during each character display period;
selecting a specific character to be stored at the activated character position by operating the switch to its second position while the selected character is being displayed in the activated character position; and thereafter,
activating another character position for the next character to be stored.

41. A method according to claim 40, in which the manual switch must be used at least twice to select a character for an activated character position.

42. A method according to claim 40, further including the step of activating each of the character positions in turn in response to selection of a character until characters have been selected for all of the character positions.

43. A method according to claim 40 in which the step of selecting a character for storage at the activated character position comprises:

suspending the display of the succession of characters which may be selected;

maintaining a display of the character displayed at the activated character position when the switch was operated, and thereafter, confirming the selection of the character by sensing the position of the single manual switch during a predetermined selection time interval after the first operation of the switch.

44. A method according to claim 43 in which the step of confirming the selection of the character comprises sensing the absence of a second operation of the switch during the selection time interval.

45. A method according to claim 43 further including step of the responding to operation of the switch during the selection time interval by resuming the display at the activated position of the succession of characters which may be selected.

46. A method according to claim 43, further including the steps of intermittently displaying the selected character at the first character position during the selection time interval and continuously displaying the selected character at the first character position after the second character position has been activated.

47. A method according to claim 40, further comprising the steps of:

establishing a succession of character scan periods, the duration of the character scan periods being shorter than the duration of the character display periods;

establishing a predetermined slow display interval;

upon activation of a character position, successively displaying the characters at the rate corresponding to the character scan period;

sensing operation of the switch;

in response to operation of the switch, suspending display of the characters at the rate corresponding to the character scan period and displaying the characters at the rate corresponding to the character display period;

sensing operation of the switch during the character display period; and responding to operation of the switch during the slow display interval to select the character being displayed at the activated character position when the switch was operated.

48. A method according to claim 47, further including the step of resuming display of the succession of characters at the rate corresponding to the character scan period if the switch is not operated during the character display period.

49. A method according to claim 47, further including the steps of:

establishing a predetermined selection interval;

sensing the position of the switch during the selection time interval; and responding to the switch being in a predetermined position during the selection time interval by activating the second character position.

50. A method according to claim 49 further including the steps of:

responding to the switch not being in the predetermined position during the selection time interval by resuming display of the succession of characters at the rate corresponding to the character display period; and resuming display of the succession of characters at the rate corresponding to the character scan period if the switch is not operated for a time thereafter corresponding to the slow display period.

51. A method according to claim 40, further including the steps of:

establishing a predetermined selection interval;

and confirming the character selection by activating the second character position if the switch is not operated during the selection time interval.

52. A method according to claim 40, further including the steps of:

establishing a set of one or more function command characters;

identifying a selected character; and activating the next character position if the selected character is not a function command character.

53. A method according to claim 52, further including the steps of:

clearing the character displayed the activated character position; and reactivating the immediately previous character position if the selected character is identified as a first function command character.

54. A method according to claim 53, further including the steps of:

clearing the characters displayed in the activated character position and in all previously activated character positions; and reactivating the first character position to permit selection and storage of new characters for all character positions if the selected character is identified as a second function command character.

55. A method according to claim 54, further including the steps of:

clearing the characters displayed in the activated character position and in all previously activated character positions; and suspending selection and storage of characters pending further instructions if the selected character is identified as a third function command character.

* * * * *